United States Patent [19]

Litchford

[11] 3,757,337

[45] Sept. 4, 1973

[54] AIRCRAFT INSTRUMENT LANDING SYSTEM

[76] Inventor: George B. Litchford, 32 Cherry Lawn Ln., Northport, N.Y. 11768

[22] Filed: Sept. 11, 1970

[21] Appl. No.: 71,402

[52] U.S. Cl............................................. 343/106 R
[51] Int. Cl............................................... G01s 1/44
[58] Field of Search................ 343/106, 107, 108 M

[56] References Cited
UNITED STATES PATENTS

| | | | |
|---|---|---|---|
| 2,977,592 | 3/1961 | Bruck............................ | 343/108 M |
| 3,191,175 | 6/1965 | Battle, Jr. et al. ............... | 343/106 R |
| 2,586,810 | 2/1952 | Frum ................................. | 343/107 |
| 2,993,665 | 7/1961 | Carpenter........................ | 343/107 X |
| 2,287,621 | 6/1942 | Kandoian............................ | 343/107 |

Primary Examiner—Malcolm F. Hubler
Attorney—Thomas M. Ferrill, Jr.

[57] ABSTRACT

Precision guidance of aircraft throughout a great volume of positions, and with spectrum economy, is achieved with coordinated scanning of coarse and fine coverage localizer antennas and coarse and fine glide-path antennas. The scan coordination is predetermined for sequential traversals of the useful scan sectors, microwave transmission through the several antennas being effected in the sequence of the scans. Each such transmission includes modulation not only in accordance with the antenna scan angle but also with the direction of movement in the scan sector. The aircraft receiver means detects the aircraft position by the detected modulation and/or reception timing of each directionally transmitted beam. General position is determinable from reception of the wide-angle (coarse) scanning beams. Precise guidance in the vicinity of a predetermined low-angle glide path is derivable from the beams transmitted through the narrow scan antennas.

18 Claims, 9 Drawing Figures

Fig. 1

INVENTOR.
George B. Litchford
BY Thomas W. Ferrill, Jr.
ATTORNEY.

INVENTOR.
George B. Litchford
BY Thomas M. Ferrill, Jr.
ATTORNEY.

AIRCRAFT INSTRUMENT LANDING SYSTEM

The present invention relates to guidance systems for aircraft, and is particularly concerned with terminal guidance systems for instrument landing of aircraft. The invention herein described was made in the course of or under a contract or subcontract thereunder, with the United States Air Force.

Previous landing systems for aircraft have been arranged for affording positional signals in a very limited range of azimuth and elevation. In such systems, the precision of guidance usually is limited even with the narrow guidance range. Also, most previous fixed-path systems fall short of optimum guidance for the wide variety of landing characteristics possessed by the various types of aircraft which are prevalent.

An object of the present invention is to provide a radio guidance system for aircraft having great versatility and providing as great precision as may be desired for the various classes of aircraft which land at the airport served by the system.

Another object is to provide a guidance system providing unambiguous guidance throughout a very great azimuthal range as well as a great range of angles of elevation.

Another object is to provide a radio instrument landing system for aircraft which is conservative of frequency spectrum and adapted for simplification of aircraft receiver requirements while meeting the great demands for good guidance capabilities throughout a great volume of aircraft positions.

Another object is to provide a system which affords maximum volumetric coverage and accuracy for those aircraft services whose needs justify the most complete facilities, while affording to other aircraft services the advantages of economy and simplicity of reception while yet retaining reliability and acceptable accuracy.

These, and other objects and advantages will be apparent from consideration of the specification and the drawings, wherein:

FIGS. 1-A and 1-B are diagrams of a torque motor and a bidirectional inertial switch usable in the apparatus shown in FIG. 1;

The ground station equipment of my instrument landing system comprises, for a given runway and a single direction of landing thereon, a localizer or azimuthal guidance transmitting system beyond the farther end of the runway and a glide path or elevation guidance transmitting system including directional antenna means alongside the runway in the vicinity of the landing touchdown region.

Figure 1:
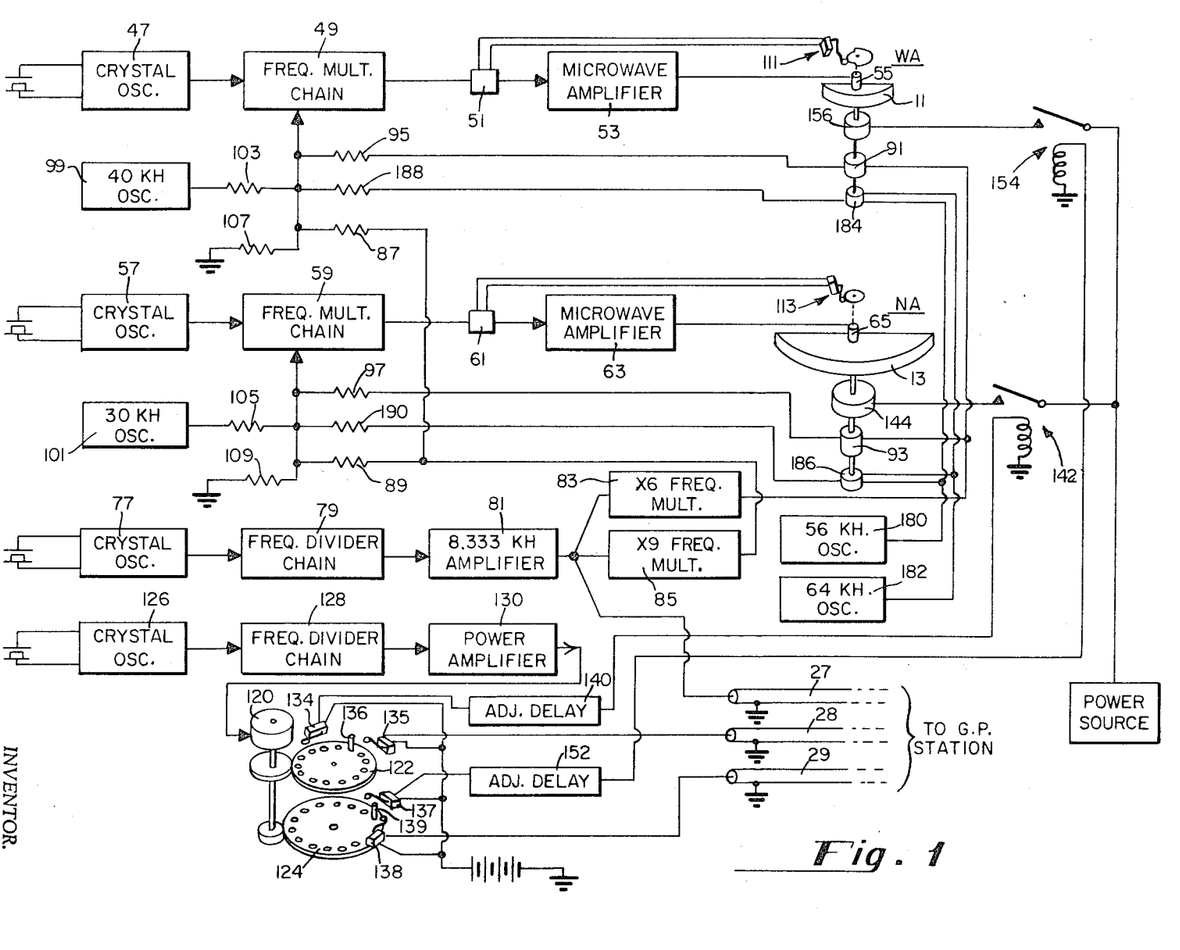
FIG. 1 is a diagram of the instrument landing radio transmitting equipment at the localizer station.

Referring now to FIG. 1, the azimuthal guidance transmitting system comprises a wide-angle scanning directional antenna 11 which will be denoted "WA" herein (for "wide azimuth") and a narrow-angle scanning directional antenna 13 which will be denoted "NA." Radio transmitter equipment presently to be described is provided for transmitting through each of the WA and NA antennas, during predetermined time slots within which each antenna is being scanned through its predetermined useful scan sector, a microwave carrier signal which is so modulated as to convey information as to the time-variation of the angle, relative to the runway center-line direction, at which the beam of the antenna is directed.

Figure 2:
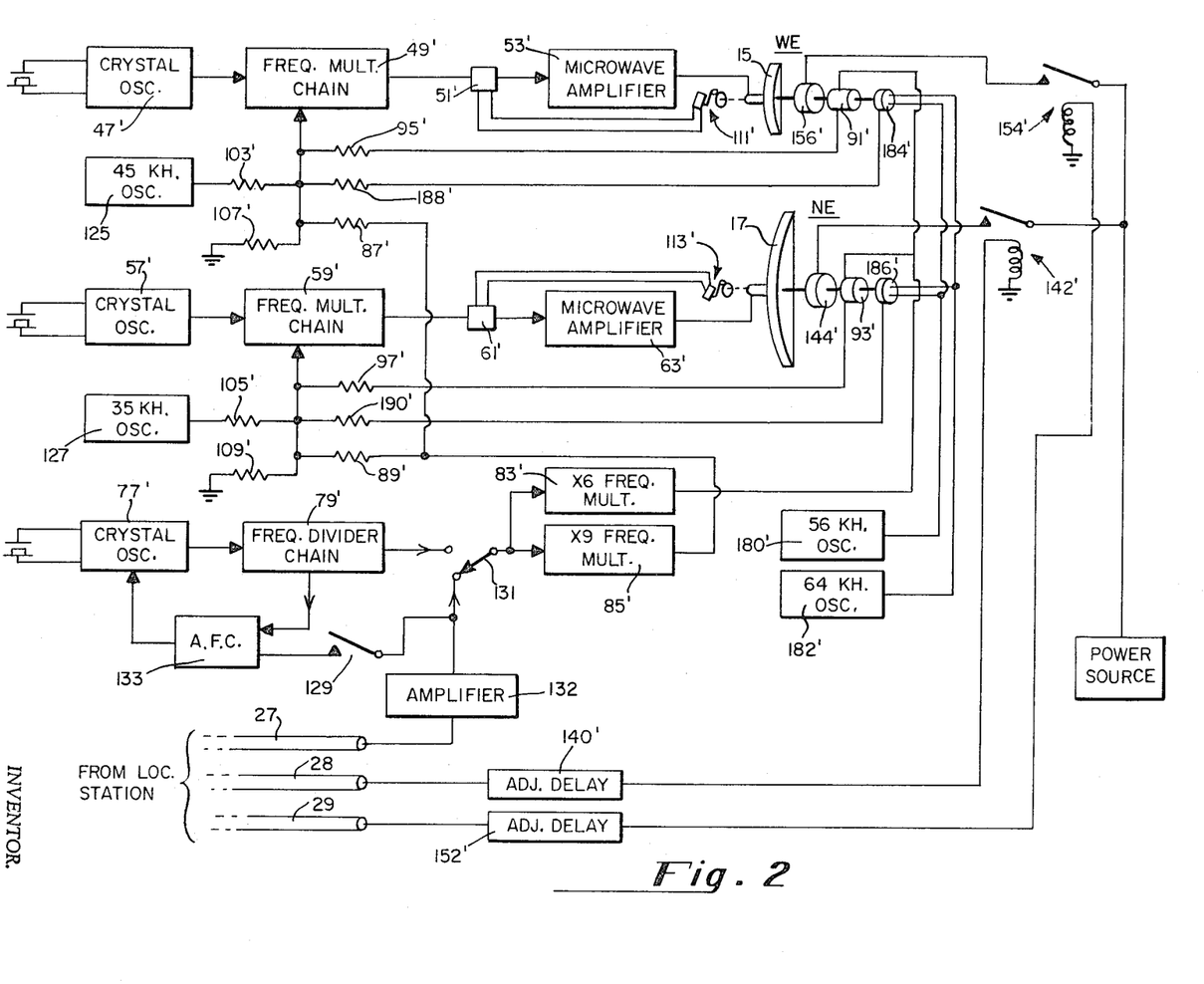
FIG. 2 is a diagram of the instrument landing radio transmitting equipment at the glide path station.

Referring now to FIG. 2, the elevation guidance transmitting system comprises a wide-angle scanning directional antenna 15 which will be denoted "WE" herein (for "wide elevation") and a narrow-angle scanning directional antenna 17 which will be denoted "NE." Radio transmitter equipment presently to be described is provided for transmitting through each of the WE and NE antennas, during predetermined time slots within which each antenna is being scanned through its predetermined useful scan sector, a microwave carrier signal which is so modulated as to convey information as to the time-variation of the angle of elevation at which the beam of the antenna is directed.

Figure 3:
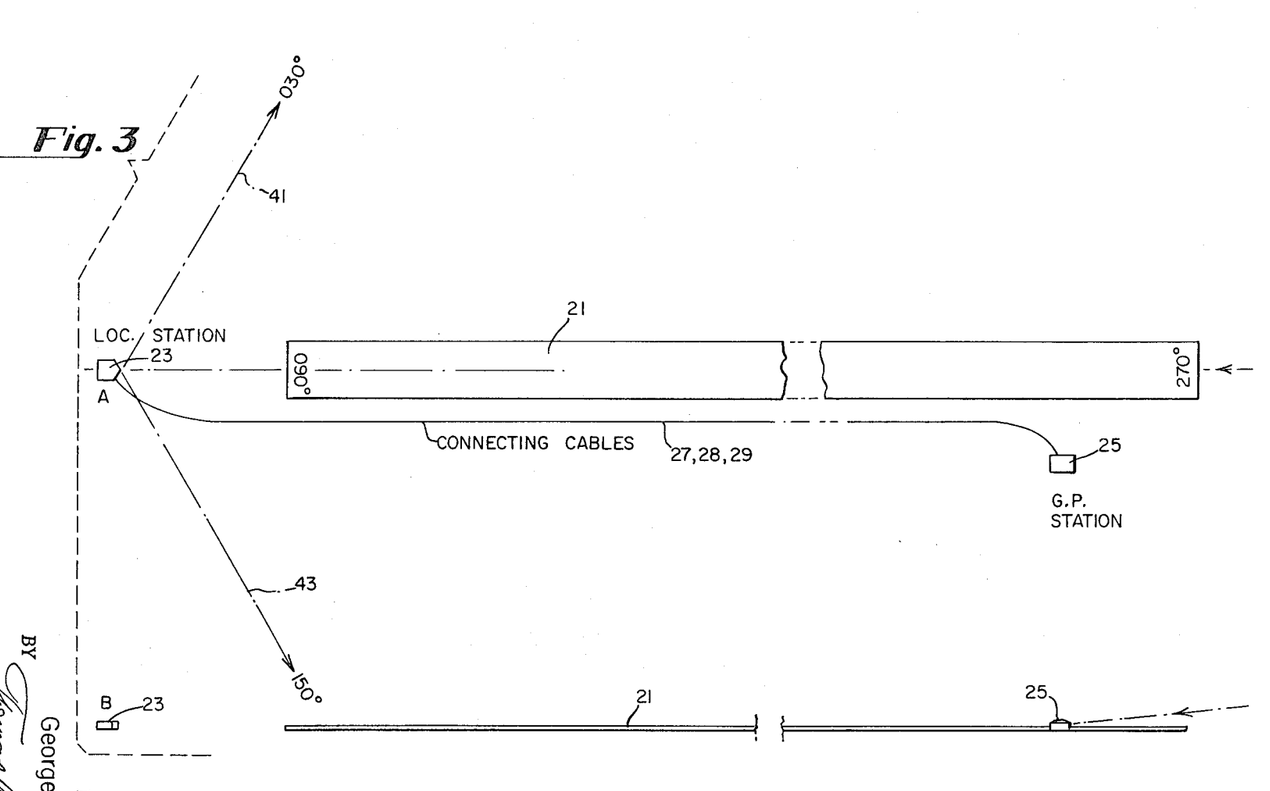
FIG. 3 is a diagram of the installation of the localizer and glide path equipment relative to one landing direction on a runway of an airport, FIGS. 3A and 3B being plan and side elevation views.

FIG. 3 shows, in plan view at A and in elevation at B, the way in which the localizer station and glide path transmitting station may be arranged for landings on a 270° heading, for example, on a given east-west runway 21. The localizer or azimuthal guidance station 23 is aligned with the runway center-line, and is positioned a selected distance beyond the west end of the runway. If desired, all of the transmitting equipment except the antenna means can be housed below grade, or it can be housed in a structure of limited height above the ground, either in line with the runway or displaced to one side. The glide path or elevation guidance transmitting system 25 is located to one side of the runway 21, and is so positioned and arranged as to minimize the likelihood of physically interfering with proper movements of the aircraft.

The localizer station 23 and glide path station 25 are intercoupled by a communication link which may, for example, comprise cables 27, 28 and 29. Over these cables 27, 28, 29 are sent the timing control signals for establishing the desired timing relations among the microwave-energy-emitting scans of the four directive antennas through their predetermined useful scan sectors and for establishing the desired relation among the modulating signals.

Figure 4:
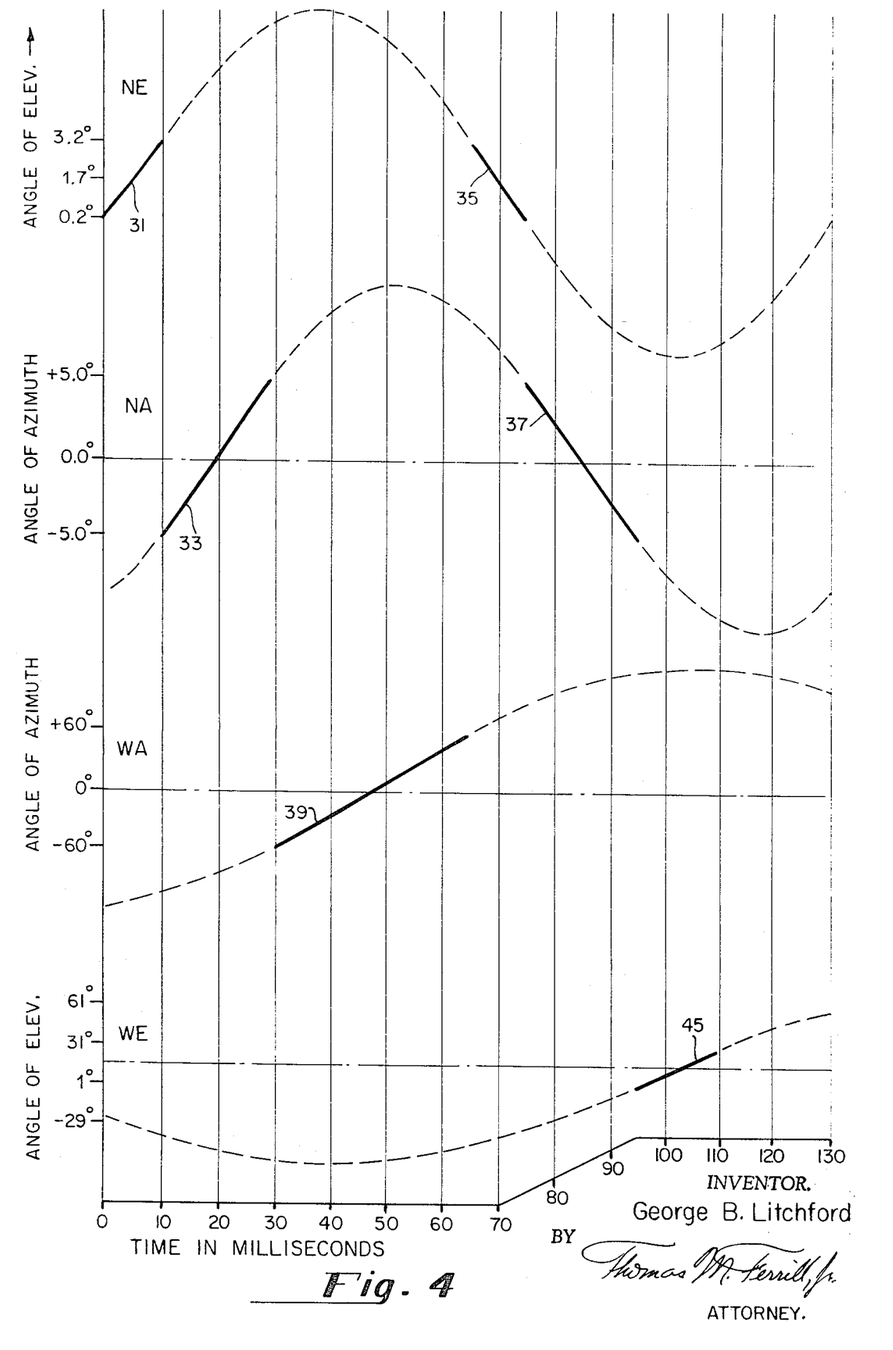
FIG. 4 is an antenna scan and switching timing diagram.

FIG. 4 illustrates one "frame" of the time sequencing of the two localizer (azimuthal guidance) and glide path (elevation guidance) directional microwave signal transmissions through the respective directional antennas. In accordance with one example of a timing relationship, each frame may be 130 milliseconds long. The time scale for the 130-millisecond frame extends horizontally across FIG. 4. Graphs of the swinging movements of the narrow elevation, narrow azimuth, wide azimuth, and wide elevation antennas are plotted at NE, NA, WA and WE respectively in order from top to bottom of FIG. 4. Within one 130-ms frame, each of the narrow elevation and narrow azimuth antennas goes through one complete swing cycle, two useful scans of signal transmission being provided by each of these antennas. The wide azimuth and wide elevation antennas are scanned at half the frequency of the narrow scan antennas. Hence, two successive 130-ms frames are required for one complete swing cycle of each of the two wide scan antennas, i.e., for a cycle of the wide azimuth scanning antenna, and likewise for a cycle of the wide elevation scanning antenna.

In the plot of the swinging of the NE antenna at the top of FIG. 4, it will be seen that this antenna oscillates about an elevation angle of 1.7°. It is so adjusted and driven as to swing through a swing amplitude of the order of 6° and 7° above and 6° to 7° below that elevation angle. Just after the axis of the beam from the NE antenna passes upward through the lowest angle of elevation at which it is to be used for transmission of microwave energy (e.g., an angle of 0.2° elevation), the microwave power is supplied to that antenna causing it to transmit for just under 10 milliseconds. During that time, the NE antenna is scanning upward through a rang of approximately 3° extent, i.e., from 0.2° to 3.2°. This portion of the upward swing of the antenna is shown in heavy line at 31 in FIG. 4.

During approximately the next twenty milliseconds (from just after the 10th millisecond until just before the 30th millisecond, transmission of microwave energy occurs through the NA antenna, as it scans through a sector of some 10° centered about the center-line direction of the runway. In the second graph from the top of FIG. 4, the heavy-line portion 33 in the time interval from about the 10th millisecond to about the 30th millisecond represents the scan of the NA antenna from about 5° to the left of the runway direction (from the localizer) to about 5° to right of that direction. Referring to the runway and instrumentation arrangement represented in FIG. 3 by way of example, the runway direction from the localizer is 090°. Hence, the sector scanned within the 10- to 30-millisecond time slot of FIG. 4, represented by heavy line 33 in FIG. 4, is from 90°−5° to 90°+5°, i.e., from about 085° to about 095°.

As previously mentioned, the NE and NA antennas each swing through one complete cycle per 130-ms frame. Each provides scanning in the reverse direction as it swings back through its predetermined scan sector, as indicated in heavy line at 35 for the NE directional antenna and at 37 for the NA directional antenna.

The WA and WE antennas, which cover much wider scan sectors, are not required to provide operation during as many time slots per second as the narrow scan antennas. It is sufficient, for example, to have transmission in half as many time slots. The WA and WE antennas each swing through one-half cycle per 130-ms frame, as shown by the two lower graphs in FIG. 4. Referring to the WA graph, the heavy-line portion 39 represents the useful scan of the WA antenna clockwise through a 120° predetermined scan sector, occurring within the time slot between just after the 30th millisecond and just before the 65th millisecond of the frame. This scan corresponds to the scan through the 120° sector from the 030° direction line 41 in FIG. 3 to the 150° direction line 43 therein.

In the frame illustrated in FIG. 4, in the time slot from just after the 95th millisecond until just before the 110th millisecond, modulated microwave energy is transmitted through the WE antenna, as represented by the heavy line portion 45 in the bottom graph of FIG. 4. This transmission occurs as the WE antenna is scanning upward through its predetermined useful scan sector from an elevation angle of approximately 1° to an elevation angle of approximately 31°.

During the next succeeding time frame (not shown), the swing cycles of the WA and WE antennas are completed. Within the time slot from the 30th to the 65th millisecond thereof, the wide azimuth antenna traverses its useful scan in the reverse direction, from the 150° direction 43 (FIG. 3) to the 030° direction 41. Similarly, within the 95th to 110th millisecond time slot, the wide elevation antenna traverses its useful scan in the reverse direction, from about 31° angle of elevation downward to about 1° angle of elevation. During that succeeding time frame, of course, the NE scans 31 and 35 and the NA scans 33 and 37 are repeated.

The beam widths for the respective scanning beams between points 3 db. down from maximum (or if preferred for sharper definition, between points 6 db. down from maximum) may be as follows:

NE 0.33°
WE 2.0°
NA 0.5°
WA 3.5°

As will be observed, the microwave energy from each of these directional antennas will be received at a level within 3 db. of maximum (or in the alternative case, within 6 db. of maximum) for about 1 millisecond in a given direction as the beam is scanned through that direction.

Apparatus for supplying the modulated microwave power to the azimuthal guidance antennas 11 and 13 is shown in FIG. 1. Each of the antennas may be fed by a separate microwave source. The system feeding WA antenna 11 comprises a crystal-controlled oscillator 47, a frequency multiplier chain 49, a microwave switch 51 and a microwave power amplifier 53. The microwave output power from the amplifier 53 is conveyed through a rotating joint 55 into the directional antenna 11. The system feeding NA antenna 13 is similar to the one described above. It consists of crystal-controlled oscillator 57, frequency multiplier chain 59, wave guide switch 61, and microwave power amplifier 63. The power from the amplifier 63 is conveyed through a rotating joint 65 into the directional antenna 13.

Figure 5:
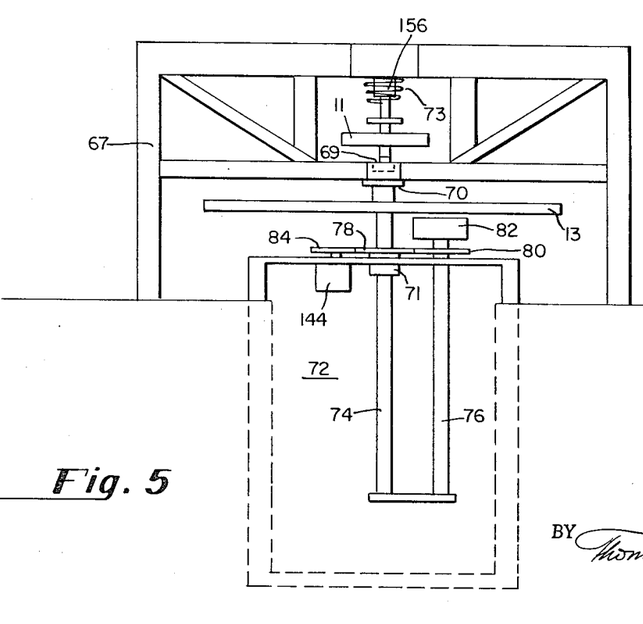
FIG. 5 is a diagrammatic view of the arrangement of the scanning antennas at the localizer.

Each of the azimuthal guidance antennas is pivotally supported and driven for oscillation about a vertical axis. One suitable arrangement is shown in FIG. 5. An open-front housing 67 is provided, at the extreme front of which the WA antenna 11 is arranged above the NA antenna 13, both facing along the center-line of the runway in their neutral positions. Bearing means 69, 70 and 71 are provided to define the vertical axes of oscillation of antennas 11 and 13. Each of these antennas is arranged as the movable mass in a resonant oscillatory system as described in U.S. Pat. No. 3,125,888 issued Mar. 24, 1964 to Sheldon Fox and Jacob Rabinow. For the wide angle oscillations of the WA antenna 11 (see the WA graph of FIG. 4), at a frequency of approximately 3.846 cycles per second, the elastance may comprise a coil spring 73 (illustrated) or a spiral spring, or a torsion bar geared to proceed through smaller angles of oscillation than the antenna 11. The drive means for the WA antenna 11 may comprise a wide angle torque motor 156, examp'es of wide angle torque motors being available as products of the Aero-flex Company of New York. One example of a torque motor is shown in FIG. 1-A and described hereinbelow.

The torsional elastance and drive system for the NA antenna 13 may be recessed in a suitable excavation 72, and may be arranged substantially identically in configuration to the structure shown and described in the aforesaid U.S. Pat. No. 3,125,888, as shown in FIG. 5, this system including torsion bars 74 and 76 geared together by meshing gears 78 and 80 thereon, an oscillatory mass 82 being provided on the upper end of torsion bar 76. Torque motor 144 is coupled to the system by its gear 84 meshing with gear 78.

Referring back to FIG. 1, the outputs supplied by amplifier 53 to its WA antenna 11 and by amplifier 63 to its NA antenna 13 are caused to be modulated according to the changing angular positions of said respective antennas. For this purpose, a crystal-controlled oscillator 77 and a frequency divider chain 79 are caused to generate an ouput frequency of 8.333 kilohertz (8,333 cycles per second). This output frequency is amplified by amplifier 81, and the amplified output is coupled to the input circuits of two frequency multipliers 83 and 85 and is also fed into the localizer end of the transmission line 27 (FIGS. 1 and 3) through which the reference phase modulations of the localizer and glide path equipments are coordinated.

Frequency multiplier 85 multiplies the supplied frequency by nine, producing an output frequency of 75 kilohertz to be modulated onto the azimuth guidance microwave energy fed to and transmitted through both localizer antennas 11 and 13. The fixed phase 75 kilohertz output from multiplier 85 is impressed on the frequency-modulation inputs of frequency multiplier chains 49 and 59 through resistors 87 and 89, respectively. Alternatively, these outputs can be impressed on the crystal oscillators 47 and 57 to generate the frequency modulation.

The other frequency multiplier 83 coupled to amplifier 81 multiplies the output frequency from amplifier 81 by six, producing a 50 kilohertz voltage. That 50 kilohertz voltage is supplied to two phase shifters 91 and 93, the rotors of which are coupled to antennas 11 and 13, respectively. Through resistors 95 and 97, respectively, the variably phase-shifted outputs of phase shifters 91 and 93 at 50 kilohertz are caused to impress 50 kilohertz modulation components on the signals produced by the respective WA and NA frequency multiplier chains 49 and 59. These modulation components undergo predetermined amounts of phase shift as the respective antennas 11 and 13 traverse their predetermined useful scanning sectors indicated in FIG. 4 as described above.

In addition to the aforedescribed fixed and variable phase modulations, frequency multiplier chains 49 and 59 have impressed thereon, respectively, a 40 kilohertz "tag" frequency (for beam identity) and a 30 kilohertz "tag" frequency, generated respectively by signal generators 99 and 101 coupled to the respective frequency modulation input circuits through resistors 103 and 105. The modulation path input resistors for each frequency multiplier chain are connected to a further resistor to ground used as an arm of a voltage divider, resistors 107 and 109 being thus used at the frequency multiplier chain modulation input circuits of chains 49 and 59, respectively.

The switching on of each transmitting system only while its directive antenna is proceeding through its predetermined useful scan sector may be accomplished in any of several different ways. One suitable arrangement comprises a cam switch operated by each directional antenna, the cam follower switches for antennas 11 and 13 being respectively shown at 111 and 113. These switches are respectively coupled to microwave switches 51 and 61 to turn them on for microwave energy transmission only during the scanning through the respective predetermined useful scan sectors. Each of the microwave switches 51 and 61 is supplied by a source of power, the cam-operated switch at the antenna being used to make and break the power actuating circuit to the respective microwave switch. While mechanical cam-actuated switches are shown, it will be apparent that photoelectric switches and opaque masking cams may be used for the same purpose.

The glide-path transmitting equipment is shown in FIG. 2. The crystal oscillator, modulated frequency multiplier chain, microwave switch, and microwave amplifier for each of the two directional antennas, the WE antenna 15 and the NE antenna 17, are similar to those shown in FIG. 1 and described in relation to the WA and NA antennas. Accordingly, the corresponding parts are given primed versions of similar numeral designations. The tag frequency signal generators for the WE and NE signals are sources 125 and 127, respectively, supplying a 45 kilohertz tag modulation component to the WE frequency multiplier chain 49' and a 35 kilohertz tag modulation component to the NE frequency multiplier chain 59' through resistors 103' and 105'.

For the generation of the reference phase and antenna angular phase modulation components, a crystal controlled oscillator 77' and frequency divider chain 79' like the oscillator 77 and divider chain 79 of FIG. 1 are provided. With switch 129 open and the arm of double-throw switch 131 thrown to its upper position, the oscillator 77' and divider chain 79' operate independently of oscillator 77 and divider chain 79, supplying to the frequency multipliers 83' and 85' a stable frequency substantially equal to, but not identical in frequency or locked in phase relative to, the output of the localizer modulation frequency divider chain. By means of switches 129 and 131, either of two other modes may be selected. By closing switch 129 and retaining switch 131 in the upper position, the output of frequency divider chain 79 and amplifier 81 transmitted to the glide path station through cable 27 may be fed to an automatic frequency control unit 133 where it is compared with the output of multiplier chain 79', the frequency of oscillator 77' being so regulated by unit 133 as to maintain a desired phase relationship between the output of divider chain 79' and the output of the amplifier 81 driven by divider chain 79. This mode of operation is advantageous for the protection it affords against a break or other stoppage of transmission in line 27. If preferred, switch 131 may be thrown to the lower position (the position shown) in which it supplies an amplified version of the signal received over cable 27, by way of amplifier 132, directly to the input circuits of the frequency multipliers 83' and 85'.

It is necessary to maintain a predetermined correlation between the scans of the NA, WA, NE and WE antennas so that their useful (energy transmitting) scan sectors are traversed in their respective assigned time slots (see FIG. 4). For this purpose, a geared-down synchronous motor 120 (see FIG. 1) is provided for driving cam wheel 122 and cam wheel 124, the latter being geared down to one-half the speed of cam wheel 122.

The synchronous motor 120 is driven by a stable a.c. source which may be controlled from any well-known reference element such as a stable tuning fork or a piezoelectric crystal oscillator, the latter being the type shown at 126, feeding into a frequency divider chain 128 and power amplifier 130. Switches 134 and 135 are each operated once every 130 milliseconds by the selectably-positioned cam pin 136 on cam wheel 122, and switches 137 and 138 are each operated once every 260 milliseconds by the cam pin 139 on cam wheel 124. Switch 134 is connected through adjustable delay device 140 (e.g., a multiply tapped lumped-constant delay line system) to the power relay 142 through which the NA antenna drive torque motor 144 is pulse actuated. The other switch 135 driven by the same cam wheel 122 is connected through coaxial cable 28 to the glide path station shown in FIG. 2, where the cam switch pulse produced by that switch 135 is subjected to an adjustable delay unit 140' and relied on to control power relay 142' through which the actuating pulses are supplied once each 130 milliseconds to torque motor 144', driving the NE antenna 17.

Similarly, the pulses produced once each 260 milliseconds by switch 137 (FIG. 1) operated by cam wheel 124 are passed through adjustable delay unit 152 to control the power-applying relay 154 connected to the torque motor 156 which drives WA antenna 11. Likewise, the other switch 138 actuated by cam wheel 124 supplies its pulse once per 260 milliseconds through cable 29 to the adjustable delay unit 152' (FIG. 2) through which the power relay 154' for the WE antenna torque motor 156' is actuated.

One form which the antenna drive torque motors may take is illustrated in FIG. 1-A. The rotor 158 is on shaft 160 which is coupled to the antenna shaft, directly or by gears. The rotor 158 comprises at least one highly permeable arcuate armature 162. The stator comprises at least one electromagnet 164 having arcuate pole faces 166 and 168 which are closely spaced from the rotor 158. An actuating power pulse is supplied to the winding 164' of the electromagnet 164 when the rotor is in the position shown in FIG. 1-A, imparting thereto clockwise torque. If desired, the rotor may include a second arcuate armature 170 symmetrical with armature 162, and the stator may include a second electromagnet 172 likewise disposed opposite electromagnet 164. A worm 174 engaging a gear sector 176 on the stator of the torque motor may be provided for setting the stator to the desired angular position for optimizing the swinging of the antenna driven by the rotor relative to the desired useful scan sector and its assigned time slot.

If it is preferred to have the torque motor provide only part of the energy for the driving of its antenna, part of the driving burden can be borne by a reciprocating drive motor system like that shown and described in U.S. Pat. No. 3,125,888.

In addition to transmitting reference phase and variable phase modulation components at 75 kh. and 50 kh., respectively, each beam generating system is arranged to transmit one modulation component when the beam is swinging in one direction and a distinguishable modulation component when it is swinging in the opposite direction. For this purpose, a 56 kh. modulating source 180 and a 64 kh. modulating source 182 are provided in the apparatus shown in FIG. 1, and corresponding sources 180' and 182' are provided in the apparatus in FIG. 2. Returning to FIG. 1, the 56 kh. output of source 180 is supplied to one side of a double-throw or bidirectional "inertial" switch 184 coupled to WA antenna 11 and the corresponding side of a similar double-throw inertial switch 186 coupled to the NA antenna 13. The 64 kh. output of source 182 is similarly connected to the opposite side of each of said double-throw inertial switches 184 and 186. The arm of switch 184 is connected to resistor 188 for introducing a frequency-modulation component of either 56 kh. or 64 kh. along with the other FM components previously described to frequency multiplier chain 49, according to whether WA antenna 11 is swinging to the right (i.e., clockwise as seen in plan view), or to the left. Similarly, the arm of double-throw switch 186 is connected to a resistor 190 having its opposite end connected to the frequency modulating input of frequency multiplier chain 59 to impart to the NA beam a modulation component at 56 kh. denoting swinging of the NA beam to the right or at 64 kh. denoting swinging of the NA beam to the left.

The corresponding parts in FIG. 2, designated with the corresponding numbers primed, are used in the same manner to impart to the WE and NE beams 56 kh. modulation components during their upward swings and 64 kh. modulation components during their downward swings.

One suitable arrangement for an inertial switch is illustrated in FIG. 1-B. The illustrated switch comprises a stator plate 192 having two oppositely disposed microswitches 194 and 196 thereon between which is arranged an actuating arm 198 having a viscous coupler 200 to a drive shaft 202. The drive shaft 202 is provided for coupling to the directional antenna to be driven therewith. When the shaft 202 is turning in the clockwise direction as seen in FIG. 1-B, the arm 198 is gently urged in that direction, and microswitch 194 is thereby actuated (closed). When the shaft 202 is turning in the opposite direction (as a result of the opposite swing of the antenna), switch 196 is actuated (closed). One terminal of switch 194 is connected to one terminal of switch 196, thus effectively forming the movable-arm connection of a single-pole, double-throw switch.

Figure 6:
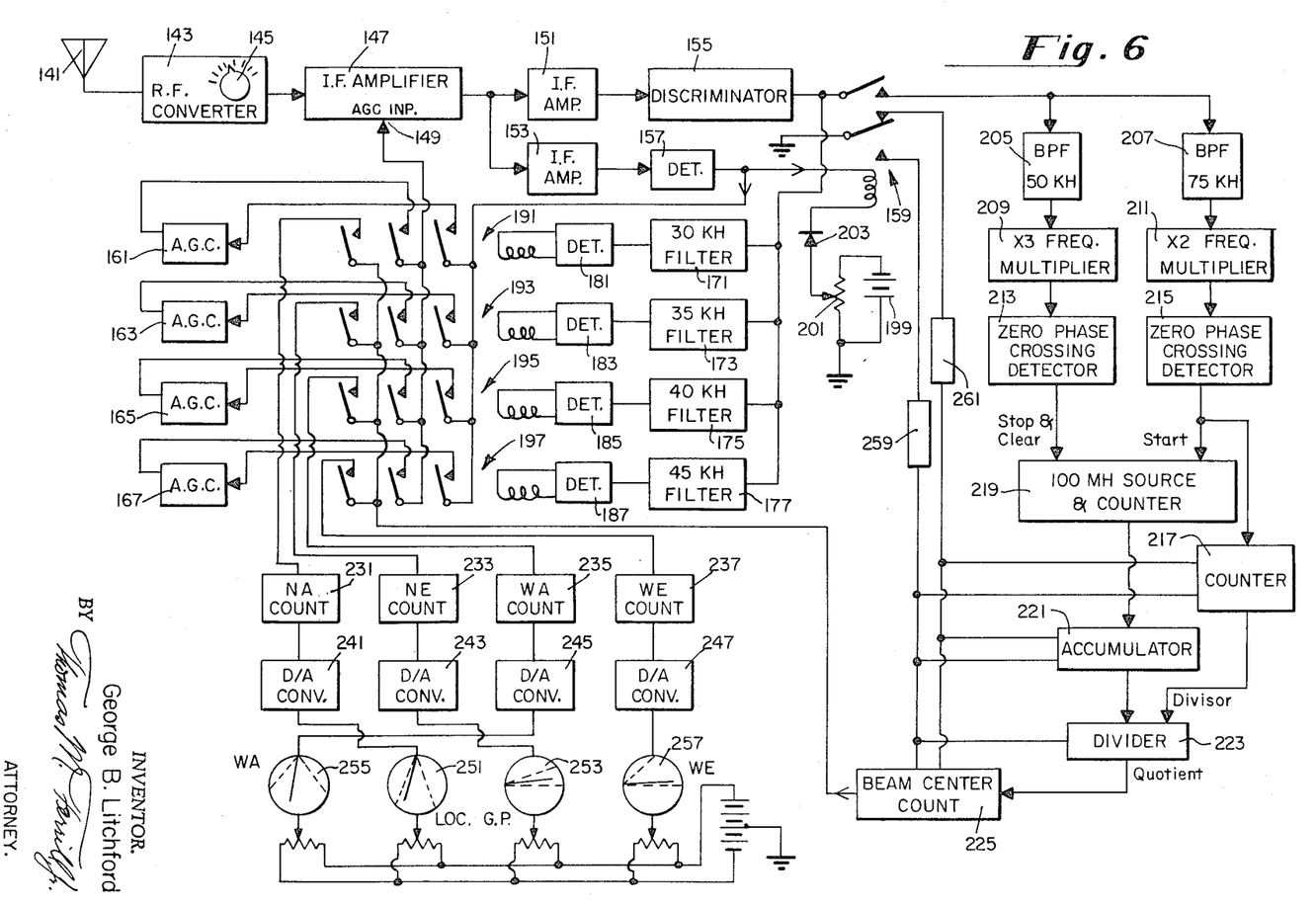
FIG. 6 is a diagram of aircraft radio receiving apparatus for use with the described ground stations.

An airborne receiving system for deriving information as to the changing position of the aircraft relative to the useful scan sectors of the guidance beams is shown in FIG. 6. The modulated microwave carrier energy is received through antenna 141 and supplied to a converter 143 having a channel switch 145. Included within the converter 143 is a heterodyne mixer and a local oscillator, together with channel selector means controlled by the channel switch 145 for selection of the receiving frequency corresponding to the carrier frequency established for a given runway heading at the airport.

The output of the converter 143 is fed into an intermediate frequency amplifier 147 having an automatic gain control (AGC) input terminal 149. The output of the intermediate frequency amplifier 147 is fed to each of two further intermediate frequency amplifiers 151 and 153. Intermediate frequency amplifier 151, which may include amplitude limiter means, supplies its output to a frequency modulation discriminator 155, which is employed to recover the beam identification or tag frequency modulation component, and also the reference phase modulation component and the variable phase modulation component which together provide information as to the angular position of the directional antenna from which, at a given time, the radio frequency carrier energy is being received.

Intermediate frequency amplifier 153 supplies its output to an amplitude detector 157, the output of which is supplied to the appropriate one of four automatic gain control generator circuits 161, 163, 165 and 167. Detector 157 also supplies its output to a relay 159 so connected and arranged as to respond to the change of amplitude of the received signal energy resulting from the traversal of the directive pattern of a given one of the four transmitting directional antennas across the aircraft receiving antenna 141.

As previously explained in connection with FIG. 4, each of the four transmitting antennas is made to be active in the transmission of radio frequency energy within its own predetermined time slot. Within time slot 31 of FIG. 4, for example, the energy transmitted through the narrow elevation antenna will impinge upon the receiving antenna 141 of FIG. 6 for a duration much shorter than the time-extent of the 10-millisecond approximate overall time allocated to the time slot 31. This will occur if the aircraft is at an angle of elevation no greater than approximately 3.2° (i.e., if the aircraft were at a much higher angle of elevation it could fail to receive the NE beam). The narrow elevation beam is narrower than the WE beam and is intended to provide the greater accuracy needed to guide and control the flareout path prior to and including touchdown. Since such flare guidance is only required at low heights, only small vertical angle coverage is needed, the 3.2° being ample. As described above in relation to FIG. 2, the energy transmitted through the narrow elevation antenna 17 is modulated with a beam identification modulation frequency of 35 kilohertz, and the transmissions through the NA antenna, the WA antenna and the WE antenna, respectively, are modulated with beam identification frequencies of 30 kilohertz, 40 kilohertz, and 45 kilohertz, respectively. In order for the airborne receiving equipment to recognize which one of the directional transmitting antennas is transmitting at a given moment, the beam recognition filters 171, 173, 175 and 177 are provided, connected to the output of discriminator 155. These filters supply their respective outputs to detectors 181, 183, 185 and 187 arranged to rectify the filter output voltages and apply them to the coils of respective relays 191, 193, 195 and 197.

Among the functions performed by a given one of the relays 191, 193, 195 and 197 during the reception of energy from a given one of the directional transmitting antennas is the activation of the appropriate one of the four automatic gain control generating circuits 161, 163, 165 and 167. For example, when the energy is being received from the narrow elevation transmitting antenna, identified by the 35 kilohertz tag (beam identity) modulation component included in its transmitted signal, filter 173 supplies to detector 183 the recovered 35 kilohertz modulation component which is rectified at 183 and caused to actuate relay 193. The two arms of relay 193 nearer to the actuating solenoid thereof couple the input and output circuits of automatic gain control voltage generator 163 to the output of amplitude modulation detector 157 and the AGC input terminals 149 of the main IF amplifier 147, respectively. Hence, during the reception of energy from the narrow elevation transmitting antenna, AGC generator 163 is effective, and its stored potential level is being readjusted from whatever value it had as a result of the preceding intervals of reception of the NE antenna output, its output being supplied to the IF amplifier 147 to regulate the gain thereof and cause the output of the amplitude modulation detector 157 to proceed through the predetermined range of amplitude, from minimum amplitude at the incidence of the NE beam, to a predetermined maximum amplitude, and back to minimum. The A.G.C. voltage applied to amplifier 147 may also be used to control the gain of converter 143.

In cooperation with the respective one of the AGC generators 161, 163, 165 and 167 (in this case, AGC generator 163), the threshold relay 159 having its coil connected to the output of detector 157 is arranged to complete the circuit from discriminator 155 to the 50 kilohertz and 75 kilohertz signal responsive phase-determining circuits for only that portion of the reception time during which the received microwave signal strength is above a predetermined threshold value (e.g., when the received signal is within 3 decibels of its maximum received strength). For this purpose, a bias source 199, potentiometer 201 and diode 203 are connected to the relay 159. The diode 203 is back-biased by the source 199 and potentiometer 201, so that, in the absence of an appreciable output voltage from detector 157, no current can flow through the coil of relay 159. When the output voltage of detector 157 rises to a value at which it exceeds the potential of the movable tap of the potentiometer 201 sufficiently to provide relay actuation current, the armature switch arms of relay 159 are pulled downward, the lower switch portion thereof connecting bandpass filters 205 and 207 to the output of the discriminator 155. The outputs of the bandpass filters 205 and 207 are fed into frequency multipliers 209 and 211, where they are multiplied up to the same frequency (in the illustrated case, to the frequency 150 kh.). The outputs of the frequency multipliers 209 and 211 are supplied to zero phase crossing detectors 213 and 215, respectively. The zero phase crossing detector 215 provides an output pulse when the 150 kh. input to said detector passes through the zero voltage condition in a predetermined direction, e.g., in the negative-going direction. Thereafter, zero-phase crossing detector 213 similarly provides an output pulse when the 150 kh. output wave from multiplier 209 passes through the zero-voltage point in the same sense (the negative-going sense). The output of zero phase crossing detector 215 is fed into a counter circuit 217, and also supplied to the start input terminal of a 100-megahertz generating and counting circuit 219. This counter circuit has its stop and clear (resetting) input circuit supplied by the output of the zero-phase crossing detector 213.

The output of the 100-megahertz source and counter circuit 219 is supplied to an accumulator 221 whose output is fed into a divider circuit 223. The divisor input of the divider 223 is provided with the output of the counter circuit 217. This circuit, when activated by the input to its start circuit or operational gate upon the deactuation of relay 159, proceeds at great speed to produce an output which is the quotient—the amount supplied from accumulator 221 divided by the count produced by counter 217. This quotient is fed into the beam center count unit 225, the output of which is supplied to the arms of relays 191, 193, 195 and 197 most remote from their respective solenoid coils.

Storage circuits 231, 233, 235 and 237 are connected to the respective switching terminals associated with the aforesaid arms of relays 191, 193, 195 and 197. The outputs of these count storing circuits are in turn connected to the inputs of respective digital-to-analog converters 241, 243, 245 and 247. The outputs of these converting circuits are in turn connected to the respective indicating instruments 251, 253, 255 and 257 (as shown), and may also be connected to automatic pilot input circuits.

Referring back to FIG. 4, within the first 10 milliseconds of a given 130-millisecond scan frame, the only one of the four antennas which is permitted to transmit the radio frequency energy at the desired channel frequency is the NE antenna. As that antenna passes through its useful scan range from 0.2° elevation to 3.2° elevation of its directive axis, the phase lag of its variable-phase modulation component relative to the phase of its reference phase output is caused to increase progressively by the action of phase shifter 93' (FIG. 2). Meanwhile, the 35 kilohertz modulation imposed upon the output of the NE antenna is being transmitted, along with the reference phase and variable phase modulation components.

Assuming that the aircraft happens to be at an angle of elevation of 2.2° above the horizontal, as measured with the NE antenna at the apex of the angle of elevation, the "nose" of the NE beam (the axis of maximum strength of radiation) will pass the antenna 141 of the receiving system (FIG. 6) approximately 6.5 milliseconds after the commencement of the 130 millisecond scanning frame. By virtue of the threshold control 201 of FIG. 6 having been set for actuation of relay 159 when the signal strength is within some 3 decibels of maximum, the relay 159 will be closed from about $t =$ 6.0 milliseconds to $t = 7.0$ milliseconds. Although threshold relay 159 is described as being actuated when the received signal is within 3 decibels of its maximum received strength other values such as 6 decibels (or even 9 decibels) may prove more practical since the rate of change of signal will be greater. This design selection is based on a value that optimizes the exact moment of initiating and terminating the angle data measurement interval. The slope of a typical microwave beam changes more rapidly in the 6 to 9 decibel region than at the 3 decibel region.

During this interval of approximately 1 millisecond duration, the 75 kilohertz component of the output of discriminator 155 is supplied to the bandpass filter 207 and thence to multiplier and zero phase crossing detector 211 and 215 respectively, for the detection of the zero crossing points (once per cycle) of the reference phase signal at 150 kilohertz. During this same interval, the 50 kilohertz output component of the discriminator 155 is passed through the same armature switch portion of relay 159 to the 50 kilohertz bandpass filter 205 and thence to the frequency multiplier 209 and zero crossing detector 213 which provide one output pulse per cycle of the variably-retarded-phase signal recovered from the particular antenna through which transmission is being accomplished (in this case, the NE antenna).

Prior to the actuation of the relay 159, i.e., before the 3-db. (or 6-db.) below maximum signal level has been attained, relay 193 has been actuated by the 35 kilohertz beam identification frequency modulation component, activating the applicable AGC circuit 163 and thereby causing the detected output of the amplitude detector 157 to vary through the desired predetermined range. Relay 193 has also completed the circuit between the beam center count unit 225 and the NE antenna elevation count storing means 233.

Within the approximately one millisecond during which the relay 159 is activated, during reception of the particular beam involved (the upward-swinging NE beam in this example), the phase lag of the output from multiplier 209 progressively increases relative to the reference phase provided at the output terminals of the frequency multiplier 211. The high frequency source and counter 219, accumulator 221, and divider 223, along with the counter 217 for providing the divisor input to divider 223, illustrate an arrangement which can be used for taking the average of the phase delay as it varies during the millisecond during which the relay 159 is activated.

In accordance with the known digital control techniques, each of circuits 217, 221 and 223, as well as beam center count unit 225, may be provided with an activate input and a restore input, so arranged that upon being provided with an activate input control potential, each of these circuits is made to operate, and upon cessation of the activate input and the supplying of a restore or reset input, each of these units is cleared, that is, it is conditioned to re-commence operation without any residual input data. For this purpose, suitable potential sources may be included within the units 217, 221, 223 and 225, or alternatively, suitable potential sources 259 and 261 may be connected to the relay terminals relied upon for unit actuation and unit resetting or restoring.

Within the time interval during which relay 159 is actuated (approximately one millisecond) by a given beam (in the case under consideration, the NE beam), there will be approximately 150 cycles of output from each of the two frequency multipliers 209 and 211. Assuming that the relay 159 were actuated for just one millisecond, there would be 150 output pulses from the zero phase crossing detector 215 coupled to the reference source, each being followed by a pulse from the other zero phase crossing detector 213, the delay intervals progressively increasing during the millisecond of operation. During that millisecond, counter 217 will progressively count from zero up to 150, producing a count corresponding to the total number of such negative-going zero phase crossings from the reference source. The counter system 219 embodying the 100-megahertz pulse source is caused to make 150 successive counts of its internally generated pulses. Each such count is initiated by the output pulse from the reference phase zero phase crossing detector 215, and is terminated by the similar, but delayed, output pulse from the variable phase zero phase crossing detector 213. The output of each successive count of counter 219 is a number representative of the phase angle difference between the 150 kh. outputs of units 209 and 211. If 150 successive counts are made during the one millisecond traversal time, each will increase progressively from the first to the 150th count in accordance with the increasing of the amount of phase shift during the millisecond measuring interval. If for example the first count of 219 is 100 the last count may be 120 with the intervening 148 counts increasing gradually from 100 to 120. The average measured count in 225 would then be the average of these counts or 110, which is representative of the angle of the beam center.

In the accumulator 221, which responds to the source and counter 219, the numbers of pulses counted during these successive pulse count times are accumulated or added up to a total number, which, when divided in divider 223 by the output of the counter 217, yields a quotient corresponding to the average number of 100 megahertz pulses which occurred within the varying intervals between the starts produced by the detector 215 and the stops produced by detector 213. Since the threshold control relay 159 provides for operation of the counting circuits through a period from the time the received beam strength has risen to within 3 db. of maximum strength to the time when it has decreased back to the same level, and since the beam is substantially symmetrical about is axis, this average count produced from the output of the divider 223 corresponds substantially to a count of the number of 100-megahertz pulses occurring between the reference phase and variable phase zero phase crossing points, when the beam axis is centered on the receiving antenna 141.

Accordingly, until reset by the upper armature elements of relay 159 upon a further beam actuation of the relay, the beam center count unit 225 registers the quotient output of divider 223 which represents the number of cycles (at the frequency of 100 megahertz) corresponding to the measure of the interval between the corresponding zero phase crossings of detectors 215 and 213.

In the example under consideration, the aircraft being at an angle of elevation of 2.2°, and the signal passage through the relay 159 having occurred from 6 milliseconds after the beginning of the scan frame to 7 milliseconds after the beginning of that frame (i.e., from $t=6$ to $t=7$ ms.), the relay 193 having remained activated from before the 6 millisecond time until after the 7 millisecond time, the output of the beam center count unit 225 is passed through the armature switch portion of relay 193 most remote from its solenoid coil as shown in FIG. 6 and down to the NE count storing unit 233. This count storing unit 233 is arranged to store the count until the next time the NE beam is received, at which time its count will be updated according to the new count value provided by unit 225. Meanwhile, the count stored in count storage unit 233 is converted by the digital-to-analog converter 243 into a corresponding current value, for actuation of the sensitive glide path instrument 253 and for actuation of any other means requiring a glide path data signal, such as autopilot means (not shown).

As will be seen by reference to FIG. 4, after the cessation of the reception of the narrow elevation scanning beam, the aircraft receiver system of FIG. 6 can be expected to receive and interpret the NA signal from the narrow azimuth transmitting antenna, some time during the interval between the tenth and the thirtieth millisecond of the 130 millisecond scan frame. The narrow azimuth beam will be received at some time during that interval provided that the aircraft is, at the time, within the relatively narrow sector through which the NA antenna provides its useful scan, i.e., the sector from minus 5° to plus 5° relative to the center line of the runway, the apex of the angle being at the location of the azimuth transmitting station. Referring to FIG. 3, where the runway is shown exemplified as a runway for landings on a 90° heading or a 270° heading, and the localizer and glide path stations are arranged for guidance of an aircraft landing on the 270° heading, let us assume that the aircraft, landing from the east, is displaced to the left of the projected runway center line to an extent corresponding to a 2-½° angle with said center line as measured with respect to an apex located at the localizer (azimuth) station. Hence, the bearing of the aircraft as seen from the localizer station 23 would be 092.5°. Such an aircraft, in order to line up with the runway center line, would need to make a slightly northerly correction of its position. The time at which the axis of the narrow azimuth antenna beam would pass through the receiving antenna 141 of the receiving system (FIG. 6) would be approximately 25 milliseconds after the commencement of a 130 millisecond scan frame period. Again, by virtue of the narrow azimuth beam width relative to its useful scan sector, this beam is scanned over the position of the receiving antenna 141 in approximately one millisecond, during which the narrow azimuth beam varies in strength from approximately 3 decibels below its maximum strength, up to its maximum, and back down to approximately 3 decibels below maximum.

During that time, from approximately $t=24.5$ to $t=25.5$ (24.5 milliseconds to 25.5 milliseconds after the commencement of the 130 millisecond scan frame), the relay 159 in FIG. 6 will be actuated, and the beam center count will be established through units 223 and 225 and passed into the NA count storing unit 231, converted to a current value in digital-to-analog converter 241, and the resulting current value passed through localizer indicating meter 251, in a manner similar to that heretofore described relative to the NE beam reception which occurred within the first 10 milliseconds of the scan frame. During this time, by virtue of the beam identification modulation component at 30 kilohertz, after recovery by the discriminator 155, being passed through filter 171 and detector 181 to actuate relay 191, AGC circuit 161 is in use, acting upon the AGC input terminal 149 of IF amplifier 147, and responding to amplitude detector 157 for any needed corrective contribution relative to the previous detected signal strength received and integrated by the AGC voltage generating unit 161.

In a similar way, in a yet further portion of the scan frame, the radio energy transmitted by the wide azimuth (WA) directional antenna beam will be received for about a millisecond within the time indicated by the heavy line portion 39 (FIG. 4), and still later, after a further reception of the NE beam and a further reception of the NA beam, the system will respond once within the 130 millisecond frame to the wide elevation (WE) antenna which is caused to transmit in the time interval from 95 milliseconds to 110 milliseconds after the commencement of this scan frame.

One important advantage of the present system is its versatility. The wide azimuthal guidance instrument 255 and the wide elevation guidance instrument 257 provide indications of the position of the aircraft in azimuth and elevation relative to the vertical plane through the center line of the runway and to the horizontal plane, for aircraft of any type operating within a very wide azimuthal sector and a very wide elevation sector. Aircraft may operate within the range of these two instruments 255 and 257, receiving therefrom reliable positional information, even when outside the range of directions for which instrument 251 and/or instrument 253 are responsive. For helicopters and for low-speed, short-take-off-and-landing craft, a receiving system relying solely upon the wide elevation and wide azimuth guidance means may suffice. For high speed, low landing angle aircraft such as jet airliners, for example, after the wide guidance instruments 255 and 257 have enabled the operator of the craft to become generally aligned with the desired runway and with respect to the elevation of the airfield, instruments 251 and 253 provide the magnified or especially sensitive guidance information needed in the immediate vicinity of the desired low-angle glide path.

Where some flaring out of the landing is desired with the benefit of instrument guidance, as for example for automatic landing systems, the present system makes possible yet a further feature, in that the narrow elevation antenna 17 of FIG. 2 may be located nearer to the localizer station than the wide elevation antenna 15, and may be arranged to cooperate if desired with the wide elevation signal output, as derived in the receiver system, to produce a flared-out termination of the landing approach to the runway.

Figure 7:
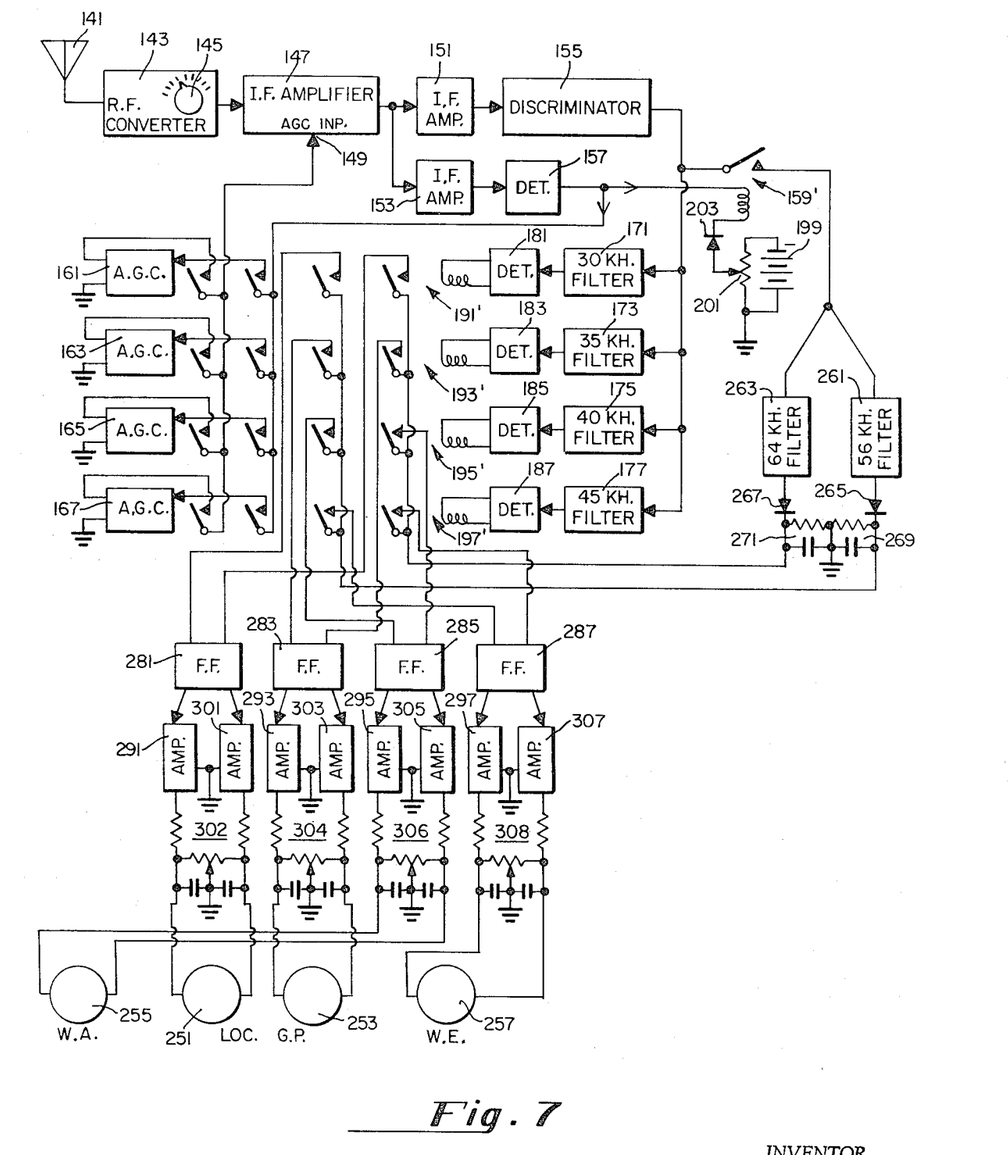
FIG. 7 is a diagram of a further version of aircraft radio receiving apparatus for use with the described ground stations.

Another type of aircraft receiver for the instrument landing system is illustrated in FIG. 7. The apparatus shown in this figure registers the position of the aircraft relative to the ground station equipments not by detecting angle-representative modulations of the transmitted signals, but rather, by responding to the asymmetry between the times of passage of a beam across the aircraft in the first direction and the passage of that same beam across the aircraft in the opposite direction of its swinging.

In FIG. 7, the portions of the receiver which are identical to portions of the receiver shown in FIG. 6 are given the same numeral designations. Thus, the antenna 141, converter 143, automatic gain controlled IF amplifier 147, limiter IF amplifier stage 151, discriminator 155, IF amplifier stage 153, and detector 157 perform the same functions as described above relative to the similar portions of the receiver in FIG. 6. Likewise, separate automatic gain control generating and storage circuits 161, 163, 165 and 167 are provided for selective insertion into the receiver gain control system when the NA beam, the NE beam, the WA beam and the WE beam, respectively, are being received.

The tuned filters for selecting the tag or beam identity modulation components are provided in the same way as in FIG. 6, these tuned circuits or filters 171, 173, 175 and 177 providing their outputs respectively to detectors 181, 183, 185 and 187, in the same way as shown in FIG. 6.

In the apparatus of FIG. 7, relays 191', 193', 195' and 197' are similar to the correspondingly numbered relays of FIG. 6, except that each such relay in FIG. 7 includes a four-pole single-throw armature switching system instead of the three-pole, single-throw armature switching system of relays 191, 193, 195 and 197 in FIG. 6.

In FIG. 7, the threshold relay 159' has a single pole, single throw armature. When this threshold relay is actuated (i.e., when the signal strength from whichever beam is being received rises above the predetermined threshold value at which potentiometer 201 is set to have the relay 159' operate), the armature switching contact of relay 159' closes, applying the output of discriminator 155 to the bandpass filters 261 and 263 tuned to 56 kilohertz and 64 kilohertz respectively. Each of these bandpass filters is provided with a rectifier and R-C load circuit, the rectifiers 265 and 267 having associated respectively therewith load circuits 269 and 271.

For actuating each of the four aircraft panel instruments 251, 253, 255 and 257, a separate system is provided for detecting, and responding to, the asymmetry between the pulsed output times for the detector and load circuit 265, 269 and the detector and load circuit 267, 271.

A two-pole switching section of each of the selective beam-recognition relays 191', 193', 195' and 197' is used to switch the outputs of the load circuits 269 and 271 to the switching input controls of four flip-flop circuits 281, 283, 285, 287, one of the flip-flop circuits being associated with each of the aforementioned four relays. Two armature switch sections of relay 191' control the application of the output of load circuits 269 and 271 to the oppositely sensed input switching terminals of flip-flop 281 associated with the localizer meter 251 which responds to the NA beam. Similarly, two armature switch sections on the relay 193' operated by the rectified output of the 35-kh. filter 173 control the application of the voltages generated in load circuits 269 and 271 to the oppositely sensed input switching terminals of flip-flop 283, associated with the glide path instrument 255 (responsive to the NE beam). The corresponding two armature sections of relay 195' (the two switch sections nearest to the coil of the relay) control the application of the output generated in load circuits 269 and 271 to flip-flop 285, associated with the wide-range azimuth indicating instrument 255. The corresponding two armature switch sections of relay 197' control the application of the output voltage produced in load circuits 269 and 271 to flip-flop 289 associated with the wide-range elevation indicating instrument 257.

To the output of each of the flip-flops 281, 283, 285 and 287 are connected a pair of symmetrical amplifier stages, the amplifiers connected to flip-flop 281 being designated 291 and 301, the amplifiers connected to flip-flop 283 being designated 293 and 303, the amplifiers connected to flip-flop 285 being designated 295 and 305, and the amplifiers connected to flip-flop 287 being designated 297 and 307. Each of these amplifiers is current-limited to produce a constant, predetermined output current value when turned on by its controlling flip-flop circuit.

The outputs of amplifiers 291 and 301 controlled by flip-flop 281 are connected to a bridge load circuit 302 including output current limiting resistors, a potentiometer having its movable arm connected to ground, and a pair of integrating capacitors connected from each end of the potentiometer to ground. Load circuits 304, 306, and 308 are similarly provided for the pairs of amplifiers connected to the outputs of flip-flops 283, 285, and 287.

In the manner which has been described previously, each of the four transmitted beams is provided with a modulation component which represents the direction in which the beam is, at a given time, being scanned through its useful scan sector. The WA and NA beams are each modulated at 56 kilohertz modulation frequency (in addition to the other modulation components) when being scanned to the right through the useful scan sectors, and are modulated at 64 kilohertz (in addition to their other modulation components) when being scanned to the left. Similarly, the NE beam and the WE beam are provided with 56 kilohertz modulation (in addition to their other components) in the respective time periods in which these antennas are scanning upward through their useful scan sectors, and with 64 kilohertz modulation components when scanning downward through the useful scan sectors.

Referring once again to FIG. 4, if the aircraft is at an angle of elevation of 1.7°, the narrow elevation beam designated NE will impinge upon the aircraft (the beam axis) at the 5th and 70th millisecond of each 130 millisecond frame. As the beam is scanning upward within the first 10 milliseconds of the frame, its scan direction is denoted by the 56 kilohertz modulation component superimposed along with the other modulation components heretofore referred to. As the reception of this beam commences, prior to its reaching the 1.7° angle of elevation of its axis, relay 193' is actuated, completing the circuits from the output terminals of rectifier load circuits 269 and 271 to the oppositely directed input trigger terminals of flip-flop 283. Then, when the predetermined threshold strength for operation of relay 159' is attained, (approximately 4.5 milliseconds after the commencement of the 130 millisecond scan frame), the 56 kilohertz modulation component is passed through bandpass filter 261 to generate a unidirectional output pulse in load circuit 269 connected to rectifier 265. This unidirectional output pulse is passed through the armature of relay 193' to the left-hand switch input terminal of flip-flop 283, causing it to flip to the condition at which amplifier 293 is turned on and amplifier 303 is turned off.

The flip-flop 283 and amplifier 293 and amplifier 303 will remain in this same condition not only until the cessation of the reception of the NE beam as it scans upward, but until the NE beam is scanning downward through its useful scan sector, in the time period denoted by heavy line 35 in FIG. 4. As that beam is scanning downward, it carries the 64 kilohertz downward-direction signifying component of modulation. As reception of the NE beam commences within the 10 millisecond time slot between the 65th and 75th millisecond of the frame, the relay 193' again is activated, again connecting the output terminals of load circuits 269 and 271 to the switching or triggering input terminals of flip-flop 283. When the threshold value is reached at which relay 159' is activated during this downward sweep, the armature of that relay closes, resulting in the passage through bandpass filter 263 of the 64 kilohertz direction-representative demodulated component. This results in a rectified pulse generated in load circuit 271 by rectifier 267, this pulse being passed through the armature switch portion nearest the coil of relay 193' to the terminal of flip-flop 283 which triggers it into the "flop" condition, turning off amplifier 293 and turning on amplifier 303.

In the same manner as aforedescribed, the flip-flop 283 will remain in this condition, with amplifier 293 turned off and amplifier 303 turned on, until a further triggering impulse is provided through bandpass filter 261, rectifier 265 and load circuit 269 when the NE beam is again scanning upward.

In the example which has been described, it has been assumed that the aircraft is at the 1.7° angle of elevation, at which the beam crossings occur just one-half frame apart (i.e., 65 milliseconds apart). If the potentiometer in the bridge circuit 304 connected to the glide path meter 253 is set to its neutral position, the indicating pointer of the glide path meter 253 will then register equality of potentials on the left and right terminals of the meter by taking a neutral position within its meter indicating range.

Now let us assume that the aircraft, at another time, is at an elevation of about 3° above the horizontal. In that event, the reception of the NE beam during its upward scan will occur several milliseconds later than in the previous instance, and conversely, its reception during the downward scan will occur several milliseconds earlier than in the previous case. This results in a rectangular wave output from the flip-flop 283, the duration of that one of its output conditions for energizing amplifier 293 being appreciably shorter than the duration of its oppositely switched condition. Accordingly, amplifier 303 connected to the output of flip-flop 283 produces appreciably more output current than amplifier 293, producing a net voltage which brings about appreciable deflection of the pointer of glide path meter 253 from the aforementioned neutral position, in the direction indicating a 3° angle of elevation. In the event of the opposite departure of the aircraft from the neutral elevation angle (departure below the elevation angle 1.7° in FIG. 4), the opposite inequality of the durations of operation of amplifiers 293 and 303 and the opposite polarity of the net resultant output potential will be produced.

In like manner, each of the other three recurrently scanning beams NA, WA, and WE of FIG. 4 produces, through its respective one of the flip-flops and the pair of amplifiers associated therewith, the deflection of meters 251, 255 and 257 according to the symmetry or asymmetry of the flip-flop switching times.

It will be readily apparent that the receiver apparatus of FIG. 7 accomplishes the ultimate indication of the positions of the four beams as they traverse the aircraft, yielding ultimate output indications substantially identical to those which are provided by the receiving apparatus of FIG. 6. The receiving system of FIG. 7 accomplished this result through simpler means than employed in FIG. 6, its precision being ample for guidance of an aircraft, particularly when it is considered that fine and coarse beam guidance is provided (for low angle glide slopes).

With the apparatus of FIG. 7, just as with the receiving apparatus of FIG. 6, the portion of the receiving system responsive to plural beams for guidance in elevation or for guidance in azimuth, or both, may be dispensed with, the system being arranged to rely on the appropriate one of the beams for elevation (and/or limited to a single beam response for azimuth) according to the needs of a particular aircraft and its intended mode of operation.

Among the advantages of the receiving system of FIG. 7 is its greater economy than the system of FIG. 6. The system of FIG. 7 accordingly is particularly attractive for private aircraft, or for aircraft which are to be provided with less elaborate instrumentation. In addition, it is entirely feasible to provide a given aircraft with one or more receivers of each of the types shown in FIGS. 6 and 7, each of these receivers having certain advantages not possessed by the other, and providing extra insurance against a major instrumentation failure.

These two diverse receiving systems illustrate, and emphasize, the great versatility of the present instrument landing system. Since this instrument landing system is provided with the angular position sensing modulation components utilized in the receiver of FIG. 6, and also with the beam scan direction sensing components relied upon by the receiver of FIG. 7, it is capable of providing the needed guidance for those aircraft provided with either or both of the two types of receiving equipment.

It will readily be appreciated that the potentiometers connected to the respective meters 251, 253, 255 and 257 in FIGS. 6 and 7 may be adjusted to cause the meter indicating needle to be in a desired position when the aircraft is on a predetermined line of travel. For example, the potentiometers connected to instruments 253 and 257 may be set to have the aircraft guided along (given "on course" indications along) a path different from the 1.7° slope line which happens to be the plane of symmetry of the scanning of the NE antenna.

This instrument landing system provides for wide-range measurement of elevation and azimuthal direction of the aircraft relative to the ground station equipment. By adding distance data from a known system of DME (distance measuring equipment), and relating the distance data to the positional data (especially angle of elevation data), as by introducing modifying signal components to the instrument landing meter circuits, the system can be made to provide any desired variations of the landing path, with, for example, changes of slope wherever desired.

As many possible embodiments may be made of the invention without departing from the scope thereof, it is to be understood that all matters herein set forth or shown in the accompanying drawings are to be interpreted as illustrative and not in a limiting sense.

I claim:

1. An aircraft instrument landing system comprising:
   plural localizer directional scanning antennas;
   plural glide path directional scanning antennas;
   the plural localizer directional scanning antennas including at least two antenna means scanned through two sectors of different angular scan amplitudes, and the plural glide path directional scanning antennas including at least two antenna means scanned through two sectors of different angular scan amplitudes;
   means including at least one source of microwave energy for causing said localizer and glide path directional scanning antennas to transmit microwave energy in a predetermined time sequence, whereby energy may be received from one of said antennas at a time;
   means for modulating the microwave energy being transmitted by each antenna, at least one component of the modulation being varied in a predetermined relation to its direction of transmission;
   and radio receiving equipment for receiving microwave energy transmitted from said antennas,
   said radio receiving equipment comprising means for identifying the one of said antennas which is transmitting by a characteristic of its radiated energy,
   and means responsive to the variation in at least one modulation component of the received energy for denoting the position of the receiving means relative to the useful scan sector of the antenna from which the energy is being received.

2. An aircraft instrument landing system as defined in claim 1,
   said instrument landing system including means for synchronizing the scanning of said antennas in a predetermined time-relationship of their useful scan sectors within which they transmit microwave energy.

3. An aircraft instrument landing system as defined in claim 2, wherein said narrow azimuth scanning antenna and said narrow elevation scanning antenna transmit microwave energy more frequently than their respective wide scanning antennas.

4. An aircraft instrument landing system as defined in claim 2,
   at least one of said scanning antennas comprising a resiliently suspended directive antenna,
   means for imparting to said antenna oscillatory movement wherein the resilience and mass of the suspended system are relied upon,
   and means for limiting the times at which microwave energy is transmitted through said antenna to those times when said antenna is traversing a predetermined useful scan sector substantially narrower than the angle traversed by said oscillatory movement.

5. An aircraft landing system as defined in claim 1, wherein said scanning of each beam is oscillatory, and said means for modulating the microwave energy being transmitted by each antenna, at least one component of the modulation being varied in a predetermined relation to its direction of transmission, comprises means for imparting to the microwave energy a modulation component distinguishing one direction of swing in its oscillation from the opposite direction of swing, whereby aircraft positional information is unambiguously derivable from the symmetry or assymmetry with respect to time of the occurrences of reception of the beam resulting from the opposite swings thereof.

6. An aircraft instrument landing system as defined in claim 2,
   said means for causing said localizer and glide path directional scanning antennas to transmit microwave energy including means for imparting to the energy transmitted through each of said antennas a predetermined distinguishing characteristic whereby said energy is distinguishable from the energy transmitted through the other antennas.

7. An aircraft instrument landing system as defined in claim 6,
   said means for imparting a predetermined distinguishing characteristic comprising means for impressing on the microwave energy a beam-identity modulation component having a modulation frequency different from the beam-identity modulation components impressed on the microwave energy transmitted through the other antennas,
   said beam identity modulation components being distinguishable in at least one respect from the modulation components varied according to antenna transmitting direction.

8. An aircraft instrument landing system as defined in claim 6,
   said means for modulating the microwave energy being transmitted by each antenna with at least one component of the modulation being varied in predetermined relation to its direction of transmission comprising means for impressing upon the microwave energy to be transmitted a phase reference modulation component and a variable phase modulation component, the phase displacement between said variable phase component and said reference phase component being varied in predetermined relation to the direction of radiation of said antenna.

9. An aircraft instrument landing system as defined in claim 8, wherein the frequency of said reference phase component and the frequency of said variable phase component are so related to each other that the products obtained by multiplication of some of said frequencies by integral factors, are of equal frequency whereby they may be phase compared at such frequency after multiplication.

10. An aircraft instrument landing system as defined in claim 6,
said identifying means in said receiving system comprising means selectively responsive to the beam identity modulation component being received at any given time for conditioning the receiving system to interpret unambiguously the changing modulation component of the scanning antenna denoted by said beam identity modulation component.

11. An aircraft instrument landing system as defined in claim 10,
said means in the radio receiving means for denoting the position of the receiving means relative to the useful scan sector of the antenna from which the energy is being received comprising means for measuring and averaging the phase variations of said one component of the modulation as it varies in its predetermined relation to the direction of transmission.

12. An aircraft receiver for an instrument landing system wherein synchronized recurrently scanning transmitting antennas are provided for scanning their guidance beams through predetermined useful sectors of elevation angles and azimuthal angles from a runway heading, at least two antennas of different beam widths and different scan angular amplitudes being provided for guidance within at least one of said sectors, one scan width being greater than the other, microwave energy being transmitted through one after another of said scanning transmitting antennas within successive predetermined time periods respectively allocated thereto, the energy transmitted through each of said scanning antennas being modulated with a modulation component varying according to the angular direction of its directive beam axis, and the transmitted energy being so varied as to impart thereto a characteristic distinguishing it from the other guidance beams,
said aircraft receiver comprising:
means for selecting and amplifying energy received from any one of said synchronized recurrently scanning transmitting antennas,
means for automatically controlling the amplification of said selecting and amplifying means and producing a detected output variation from a predetermined threshold strength to a predetermined maximum strength and back to said threshold strength as the directive radiation pattern traverses the aircraft's position,
means for determining the average of the antenna axis directions traversed while the detected output varies from the threshold strength up to maximum strength and back to said threshold strength,
and means for readjusting the amplification of said selecting and amplifying means upon receiving energy from a different one of the scanning transmitting antennas and producing detected output variations resulting from the microwave energy received therefrom which are substantially equal to the variations of detected output strength from the antenna from which the energy was previously received.

13. An aircraft receiver for an instrument landing system wherein plural directional beams of microwave energy are scanned through predetermined useful scan sectors encompassing landing paths of various desired glide angles for aircraft, the plural beams, each distinguishable from the others, being transmitted in different time slots, and the energy of each beam being continuous-wave modulated according to the angular position of the beam, said plural beams including at least two beams of unequal angular scans scanned in the same scan aspect, said receiver comprising:
means for receiving, amplifying and demodulating the continuous-wave modulated energy from each beam during its impingement on the aircraft,
a plurality of sets of circuits each including means for storing and utilizing electrical signals representing beam angles,
one such set of circuits being provided for each of the plural directional beams to be received successively during an aircraft approach and landing on a predetermined runway served by the plural directional beams,
means responsive to the distinguishing characteristics of each beam for selectively activating, during the reception of that beam, the respective one of said sets of circuits,
means for selectively responding to the received and detected output of said receiving, amplifying and demodulating means only during part of the time when one beam is being received, that part of the time being when the signal strength of reception of that beam is within a predetermined ratio to the maximum signal strength reached as the beam's maximum radiation direction passes over the aircraft and its receiver,
and means responsive to said selectively responding means for supplying to the respective signal storing and utilizing means signals representative of the angular position of the received beam.

14. An aircraft receiver for an instrument landing system as defined in claim 13,
said means responsive to the distinguishing characteristics of each beam for selectively activating the respective one of said sets of circuits comprising a selective filter for accepting a demodulation component denoting the beam received, and circuit activating means responsive to the output of said filter.

15. An aircraft receiver for an instrument landing system as defined in claim 13,
said means for selectively responding to the received and detected output only during part of the time when one beam is being received comprising means so regulating the gain of said receiving, amplifying and demodulating means as to cause a detected output resulting from the received beam to rise to a maximum strength substantially equal to a predetermined maximum signal level, and means for passing demodulated components derived from the beam into said means for supplying signals representative of the angular position of the received beam only when the strength of said detected output is above a threshold value which is a predetermined substantial fraction of said predetermined maximum signal level.

16. An aircraft instrument landing system comprising:
 at least one localizer directional scanning antenna;
 at least one glide path directional scanning antenna;
 means coupled to each of said antennas for generating a directive beam of microwave energy and sweeping it alternately in one sense and the opposite sense through a predetermined useful scan sector;
 at least one further directional scanning antenna scanned in the same directional aspect as one of said localizer and glide path directional scanning antennas but having a different angular scan therefrom;
 means for establishing a time-shared transmitting relation between the beams transmitted by said antennas;
 means for imparting to the microwave energy transmitted by each of said antennas a distinctive character by which to indicate whether the beam thereof is being swept in one direction or the opposite direction through said predetermined useful scan sector thereof, and
 radio receiving equipment for receiving microwave energy transmitted from said antennas,
 said equipment comprising means responsive to the time delay from a microwave energy impingement on the aircraft as a beam swing swings in a first direction to the microwave energy impingement as the same beam swings the opposite way, and responsive to the comparative time delay to the microwave energy impingement as the same beam again swings in the first direction.

17. An aircraft radio receiver for an instrument landing system wherein at least one localizer directional scanning beam is oscillatorily scanned through a predetermined scan sector many times as wide as said beam and at least one glide path directional scanning beam is oscillatorily scanned through a predetermined scan sector many times as wide as said beam, each beam having imparted thereto a modulation signifying its direction of swing through its scan sector, at least one further directional scanning beam having a different width of scan and being scanned in the same directional sense as at least one of said localizer and glide path directional scanning beams, said receiver comprising:
 means for receiving and detecting energy from the localizer beam each time it impinges on the aircraft as it swings clockwise in plan view and each time it impinges on the aircraft as it swings the opposite way,
 first means in the receiver for providing a signal varying in a predetermined relation to differential between the interval from the localizer beam impingement in the clockwise swing to its impingement in the counter-clockwise swing and the interval between the counter-clockwise swinging beam impingement and the succeeding clockwise swinging beam impingement,
 means for receiving and detecting energy from the glide path beam each time it impinges on the aircraft as it swings upward and each time it impinges on the aircraft as it swings downward, and
 second means in the receiver for providing a signal varying in a predetermined relation to the differential between the interval from the glide path beam impingement in the upward swing to its impingement in the downward swing and the interval between the downward swinging beam impingement and the succeeding upward swinging beam impingement.

18. An aircraft radio receiver as defined in claim 17, further including
 means responsive to said first and second signal providing means for providing a measure of aircraft position as it varies in relation to said beams with resultant variation of the differential delays between the beam impingement intervals.

* * * * *